United States Patent
Fruchard et al.

(10) Patent No.: US 10,089,839 B2
(45) Date of Patent: Oct. 2, 2018

(54) CONTROL MODULE FOR A HUMAN-MACHINE DIALOGUE SYSTEM

(71) Applicant: Schneider Electric Industries SAS, Rueil-Malmaison (FR)

(72) Inventors: Bertrand Fruchard, L'Isle d'Espagnac (FR); Francis Chauvet, Mouthiers (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 14/873,330

(22) Filed: Oct. 2, 2015

(65) Prior Publication Data
US 2016/0125708 A1    May 5, 2016

(30) Foreign Application Priority Data

Nov. 4, 2014   (FR) ..................... 14 60641

(51) Int. Cl.
*G08B 5/36*      (2006.01)
*G06F 3/02*      (2006.01)
*H01H 13/02*     (2006.01)

(52) U.S. Cl.
CPC ............. *G08B 5/36* (2013.01); *G06F 3/0202* (2013.01); *G06F 3/0227* (2013.01); *H01H 13/023* (2013.01)

(58) Field of Classification Search
CPC ....... G06F 3/0202; G06F 3/0227; G08B 5/36; H01H 13/023
See application file for complete search history.

(56) References Cited

U.S. PATENT DOCUMENTS

| 6,215,204 B1 | 4/2001 | Brown et al. |
| 7,030,858 B1 | 4/2006 | Belhaj |
| 2003/0058623 A1 | 3/2003 | Veil et al. |

(Continued)

FOREIGN PATENT DOCUMENTS

| EP | 1 096 690 A1 | 5/2001 |
| EP | 1 703 530 A1 | 9/2006 |
| EP | 2 012 431 A1 | 7/2009 |

OTHER PUBLICATIONS

French Preliminary Search Report dated Aug. 10, 2015, in French Application 14 60641, filed on Nov. 4, 2014 ( with English Translation of categories of Cited Documents and Written Opinion).

(Continued)

*Primary Examiner* — Emily C Terrell
*Assistant Examiner* — Rajsheed Black-Childress
(74) *Attorney, Agent, or Firm* — Oblon, McClelland, Maier & Neustadt, L.L.P.

(57) ABSTRACT

A control module and a human-machine dialog system including the control module. The human-machine dialog system includes one or more human-machine dialog devices connected in series, a human-machine dialog device including a functional element including at least one electrical contact, an indicator or a combination of at least one electrical contact and of an indicator. The control module includes a microcontroller, a common terminal designed to be connected to each functional element and several terminals each dedicated to the individual control of the functional element of each human-machine dialog device.

9 Claims, 5 Drawing Sheets

(56) References Cited

U.S. PATENT DOCUMENTS

| | | |
|---|---|---|
| 2003/0058845 A1 | 3/2003 | Tierling |
| 2006/0209488 A1 | 9/2006 | Papenbreer |
| 2012/0191458 A1* | 7/2012 | Benni ................... G06F 3/0202 |
| | | 704/270 |

OTHER PUBLICATIONS

Anonymous "Getting Extra Pins on ATtiny", Technoblogy, XP055200789, http://www.technoblogy.com./show?LSE, 2014, 5 pages.

* cited by examiner

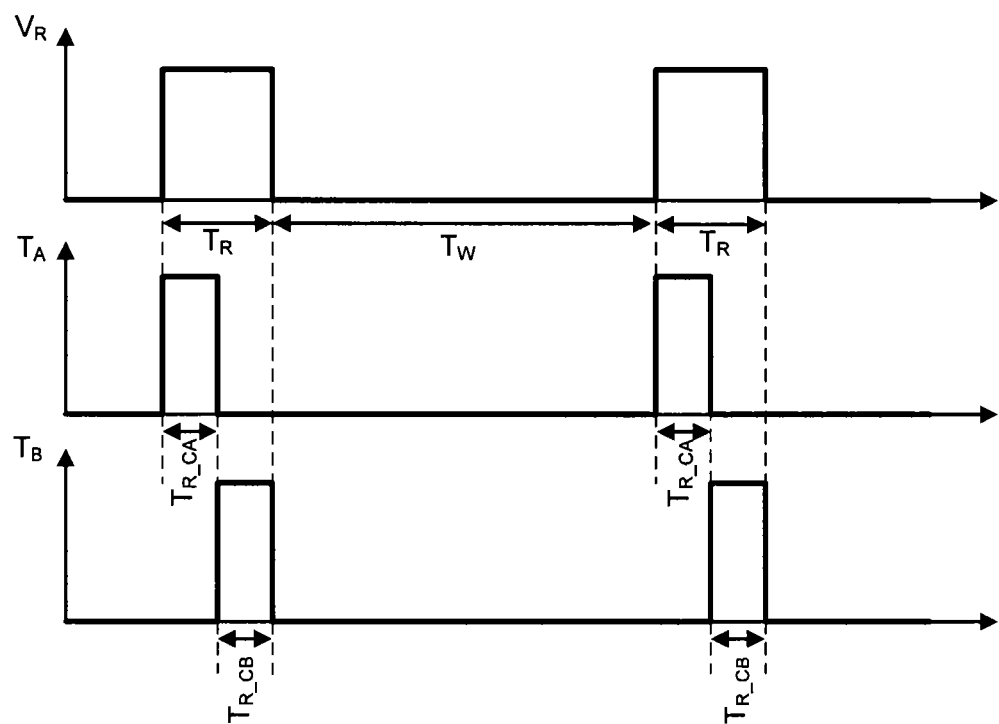

CONTROL MODULE FOR A HUMAN-MACHINE DIALOGUE SYSTEM

TECHNICAL FIELD OF THE INVENTION

The present invention relates to a control module for a human-machine dialogue system and also to a human-machine dialogue system including the said control module.

The human-machine dialogue system notably comprises one or more connected human-machine dialogue devices in series, a human-machine dialogue device comprising at least one electrical contact, a light-emitting indicator or a combination formed from at least one electrical contact and from one light-emitting indicator.

PRIOR ART

The Patent application EP 2 479 646 A1 describes a human-machine dialogue system comprising a first part equipped with a data processing unit and an electrical power supply unit, a second part comprising several human-machine dialogue devices each equipped with a human-machine dialogue interface and a communications bus connecting the power supply unit and the processing unit to each human-machine dialogue device.

The principal drawback of this architecture is that it uses intelligent human-machine dialogue devices, in other words including a microprocessor and a memory for storing their state. This architecture is thus more complex and more costly.

The aim of the invention is to provide a human-machine dialogue system in which the human-machine dialogue devices lack intelligence and a control module allowing each human-machine dialogue device to be addressed via a cabling employing a minimum of wires.

DESCRIPTION OF THE INVENTION

This aim is achieved by a control module for a human-machine dialogue system, the said human-machine dialogue system comprising one or more connected human-machine dialogue devices in series, a human-machine dialogue device comprising a functional element comprising at least one electrical contact, an indicator or a combination of at least one electrical contact and of an indicator, the said control module comprising a microcontroller, a common terminal designed to be connected to each functional element and several terminals each dedicated to the individual control of the functional element of each human-machine dialogue device, the said control module also comprising:
  reading means configured for applying, over one read period, a voltage of a first sign between its common terminal and each dedicated terminal in order to read the state of each electrical contact of the connected human-machine dialogue devices,
  writing means configured for applying, over one write period, a voltage of sign opposite to the first sign in order to write the state of each indicator of the connected human-machine dialogue devices.

According to one particular feature, the control module is configured for controlling the reading means and the writing means alternately over time and in that the read period is short with respect to the write period.

The invention also relates to a human-machine dialogue system comprising a control module such as defined hereinabove and several human-machine dialogue devices connected in series, a human-machine dialogue device comprising a functional element comprising at least one electrical contact, an indicator or a combination of at least one electrical contact and of an indicator, the said control module comprising a common terminal connected to all the human-machine dialogue devices and a terminal dedicated to the individual control of each functional element of the human-machine dialogue devices.

According to one particular feature, the system comprises for example:
  a human-machine dialogue device equipped with a functional element having a first electrical contact and a second electrical contact connected in parallel,
  means for determining the state of the first electrical contact and the state of the second electrical contact over said read period.

With a human-machine dialogue device with two electrical contacts, the determination means are configured for determining the state of each electrical contact by:
  the level of current flowing through each electrical contact, or
  the level of voltage across the terminals of each electrical contact, or
  by dividing up the read period into a first part designed to read the state of the first electrical contact and into a second part designed to read the state of the second electrical contact.

Preferably, the human-machine dialogue devices are connected to the control module by a point-to-point link via a network of twisted cables.

Preferably, the indicator is of the light-emitting type.

BRIEF DESCRIPTION OF THE FIGURES

Other features and advantages will become apparent in the detailed description that follows presented with regard to the appended drawings in which:
FIG. 8A shows a functional element with two electrical contacts connected in parallel and allowing the reading of the state of the two contacts and FIG. 8B illustrates the read time allocated to the reading of the state of each electrical contact.

DETAILED DESCRIPTION OF AT LEAST ONE EMBODIMENT

The framework of the invention is a human-machine dialogue system comprising:
  several human-machine dialogue devices 2 connected in series,
  a control module 1 implemented in one or two parts.

The control module 1 comprises a microcontroller 10 allowing the state of each human-machine dialogue device to be read and to be written and an interconnection block designed to individually address each human-machine dialogue device. The interconnection block and the microcontroller 10 may be installed together in the same housing or separate via a wired or wireless link, the intelligence of the microcontroller 10 being able to be remote with respect to the interconnection block.

In the following part of the description, the use of the expression "control module" should be considered as covering the two possible architectures. In the appended figures, the control module is represented in the form of a single housing incorporating the interconnection block and the microcontroller 10.

Figure 1:
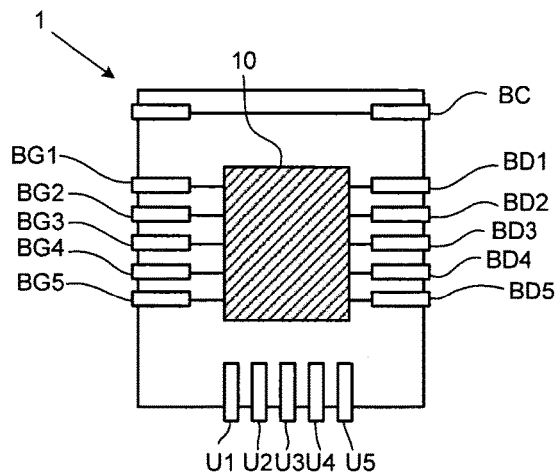
FIG. 1 shows, schematically, the control module of the invention.

The control module 1 comprises a common electrical contact terminal BC, a first series of electrical contact terminals referred to as upstream terminals BGi, a second series of electrical contact terminals referred to as downstream terminals BDi, i going from 1 to n (with n greater than or equal to 2–n=5 in FIG. 1). The upstream electrical contact terminals BGi are connected by cabling to the electrical contact terminals BDi, via the microcontroller 10.

The control module 1 may also comprise terminals U1 to U5 allowing it to be connected to a central control system, for example to a programmable logic controller (PLC).

Generally speaking, the control module according to the invention is used for controlling one or more human-machine dialogue devices 2.

Each human-machine dialogue device 2 takes the form of a housing and comprises several terminals, referred to as upstream terminals BGi (with i in the range between 1 and n and n greater than or equal 2–n=5 in the appended figures), and several terminals, referred to as downstream terminals BDi (with i in the range between 1 and n and n greater than or equal to 2–n=5 in the appended figures). Each human-machine dialogue device 2 also comprises a functional element 20 composed of at least one electrical contact, of an indicator or of a combination of at least one electrical contact and of an indicator. The indicator may be of any type, light-emitting, vibrating or audible, etc. In the following part of the description and in the figures, the example of a light-emitting indicator will be taken.

Figure 3A:
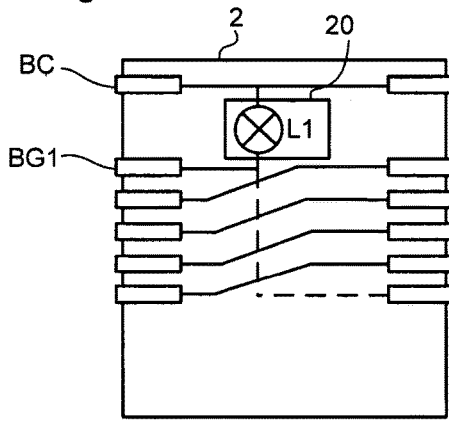
FIGS. 3A to 3D show, schematically, a human-machine dialogue device in various configurations.
Figure 3B:
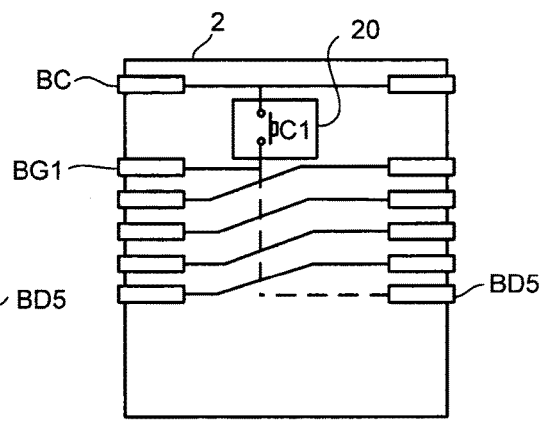
Figure 3C:
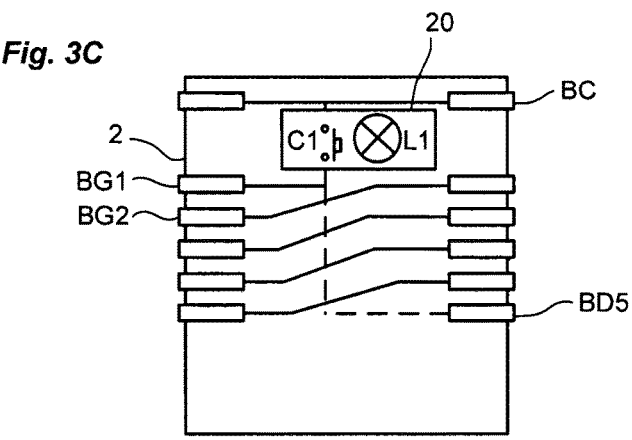
Figure 3D:
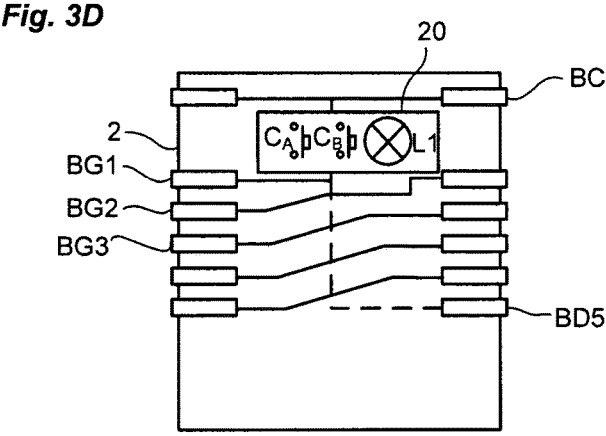

The connection between the human-machine dialogue devices 2 and the control module is implemented by means of a twisted cable. According to various configurations, there can be:

- a human-machine dialogue device with one functional element comprising an electrical contact C1 or a light-emitting indicator L1 (FIGS. 3A and 3B) connected to the common terminal BC, to the terminal BG1 and to the terminal BDn (BD5 in FIGS. 3A and 3B). Each of the other terminals BGi (with i greater than or equal to 2) is directly connected to the terminal BDi-1 of this dialogue device.
- a human-machine dialogue device with one functional element comprising an electrical contact C1 and a light-emitting indicator L1 connected in parallel (FIG. 3C) to the common terminal BC, to the terminal BG1 and to the terminal BDn (BD5 in FIG. 3C). Each of the other terminals BGi (with i greater than or equal to 2) is directly connected to the terminal BDi-1 of this dialogue device.
- a human-machine dialogue device with one functional element comprising two electrical contacts $C_A$, $C_B$ and a light-emitting indicator L1 connected in parallel (FIG. 3D) to the common terminal BC, to the terminal BG1 and to the terminal BDn (BD5 in FIG. 3D). Each of the other terminals BGi (with i greater than or equal to 2) is directly connected to the terminal BDi-1 of this dialogue device.

Depending on the position of the human-machine dialogue device with respect to the control module 1, the former will be addressed via a separate terminal of the control module 1. Its position with respect to the control module 1 corresponds to its address. The human-machine dialogue device 2 does not therefore require any addressing configuration.

Figure 2A:
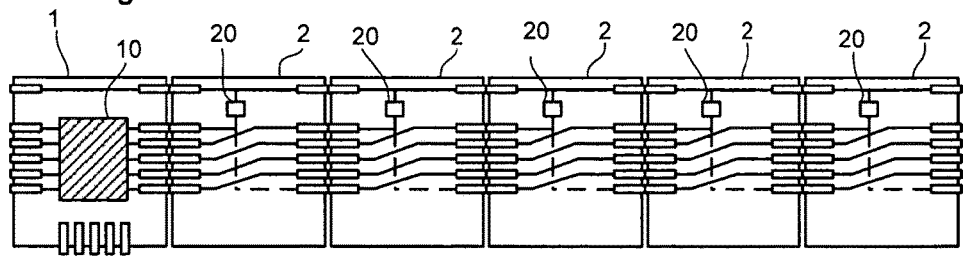
FIGS. 2A to 2C show the human-machine dialogue system of the invention in various configurations.
Figure 2B:
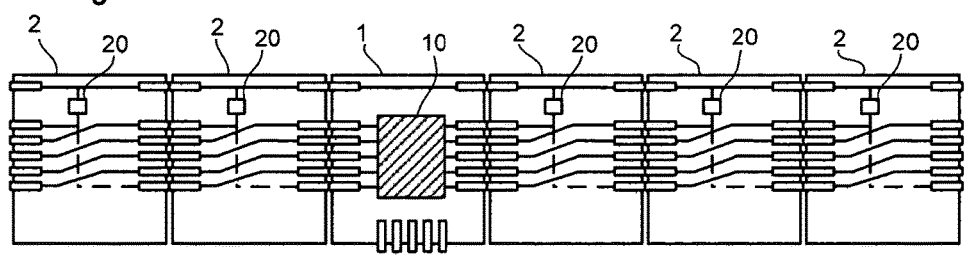
Figure 2C:
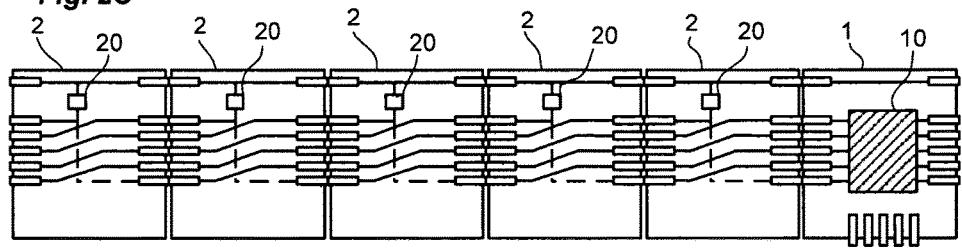

Employing of a twisted cabling notably allows the control module 1 to be able to be positioned anywhere with respect to the human-machine dialogue devices, in other words at the head (FIG. 2A), between at least two human-machine dialogue devices (FIG. 2B) or at the tail (FIG. 2C).

In one variant embodiment of the invention not shown, the functional elements of the human-machine dialogue devices are detached from the connection part and each human-machine dialogue device can be physically connected to another human-machine dialogue device, which is not necessarily adjacent to it, via a multi-conductor cable.

From the description hereinabove, it can be seen that all the human-machine dialogue devices 2 are physically connected together and to the control module 1, either directly, or through other adjacent dialogue devices, such that the control and state signals of each of these devices may be directly exchanged with the control module 1. By virtue of the twisted cabling described hereinabove, several human-machine dialogue devices 2 may be connected in series with the control module 1 and exchange data with this module whatever their respective positions with respect to it.

According to the invention, the control module 1 is also configured for reading and writing the state of each functional element 20 of the human-machine dialogue devices 2 connected to it.

For a human-machine dialogue device whose functional element comprises at least one electrical contact C1 and a light-emitting indicator L1 connected in parallel between the same terminals, the reading and the writing cannot be carried out at the same time.

For this purpose, the control module 1 applies a positive or negative voltage between the common terminal BC and the terminal BDi dedicated to the functional element 20 of the human-machine dialogue device addressed.

Figure 4:
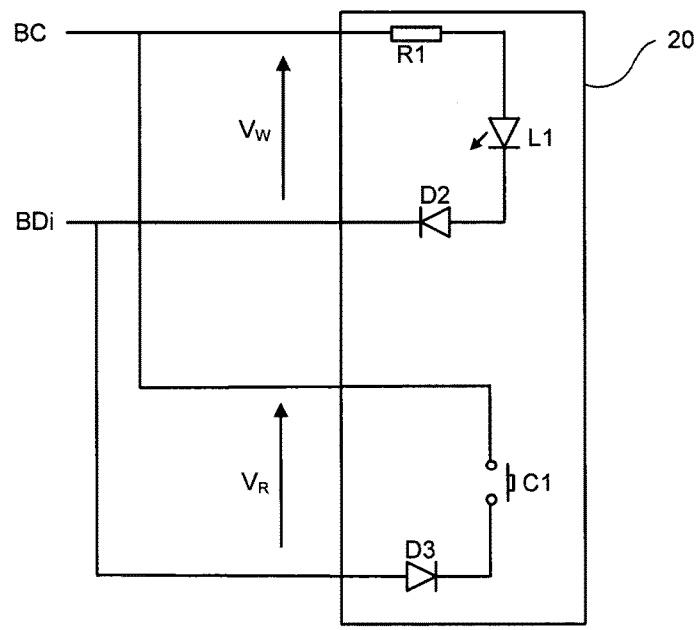
FIG. 4 shows the circuit diagram of a functional element comprising a light-emitting indicator and an electrical contact connected in parallel.

FIG. 4 shows schematically the functional element 20 connected between the common terminal BC and the terminal BDi and comprising a light-emitting indicator L1, for example a light-emitting diode, and an electrical contact C1 connected in parallel between these terminals. In addition to the light-emitting indicator L1, the functional element 20 comprises a resistance R1 and a diode D2 connected in series with the light-emitting indicator L1. In order to write the state of the light-emitting indicator L1, the control module 1 implements writing means configured for applying a voltage $V_W$ between the two terminals, allowing a current to flow through the light-emitting indicator L1. In series with the electrical contact C1, the functional element 20 comprises a diode D3, the diode D3 being oriented in the reverse direction with respect to the diode D2 in series with the light-emitting indicator. In order to read the state of the electrical contact C1, the control module implements reading means configured for applying a voltage $V_R$ between the two terminals, with a sign opposite to the voltage $V_W$, and enabling a current to flow through the electrical contact C1 if the latter is closed.

The sign of each voltage $V_W$ and $V_R$ is chosen depending on the orientation of the diodes D2, D3.

Figure 5:
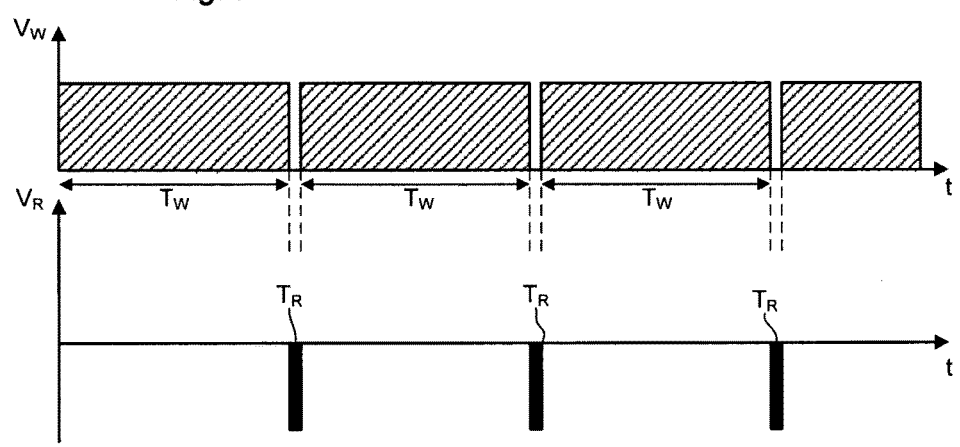
FIG. 5 illustrates the read and write times applied by the control module,
  FIG. 6, respectively

With reference to FIG. 5, for each human-machine dialogue device 2 connected to it, the control module 1 is thus configured for applying a period $T_W$ for writing and a period $T_R$ for reading the states of the electrical contact C1 and of the light-emitting indicator L1 of the functional element by alternately applying the voltage $V_W$ and the voltage $V_R$. The read phase is carried out for a very short period of time while interrupting the write phase. The read phase will for example last a few milliseconds and the interrupt, intended for this read operation, will remain invisible to the naked eye. As shown in FIG. 5, two long write periods for the light-emitting indicator are thus each time separated by a short period for reading the electrical contact. This strategy is applied by the control module 1 for each human-machine dialogue device 2 of the system. The read period will for example represent less than 1% of the total duration needed for the read and write operations.

Figure 6:
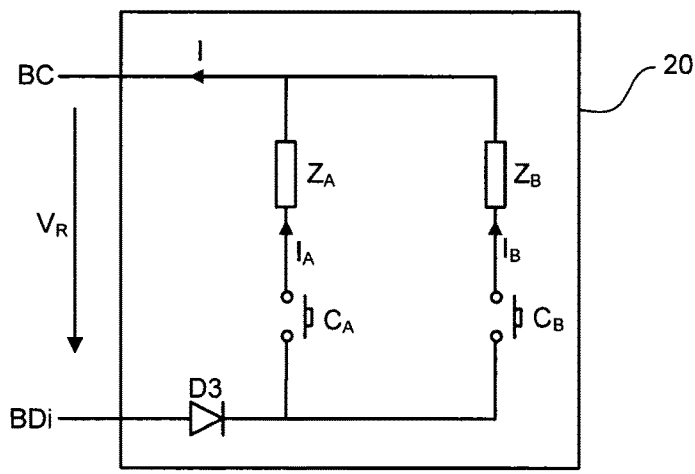
Figure 7:
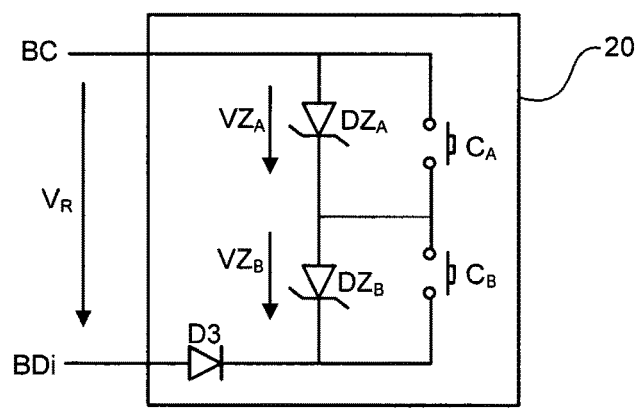
FIG. 7, show a functional element with two electrical contacts connected in parallel, respectively in series, and allowing the reading of the state of the two contacts.

For a functional element 20 that comprises two electrical contacts $C_A$, $C_B$ connected in parallel, the control module 1 must be able to determine the respective state of each electrical contact $C_A$, $C_B$. FIGS. 6 to 8 show several embodiments allowing the control module 1 to read the states of the two contacts $C_A$, $C_B$ by employing only a single wire. The two electrical contacts $C_A$, $C_B$ are connected in parallel between the common terminal BC and a terminal BDi of the control module 1.

Figure 8A:
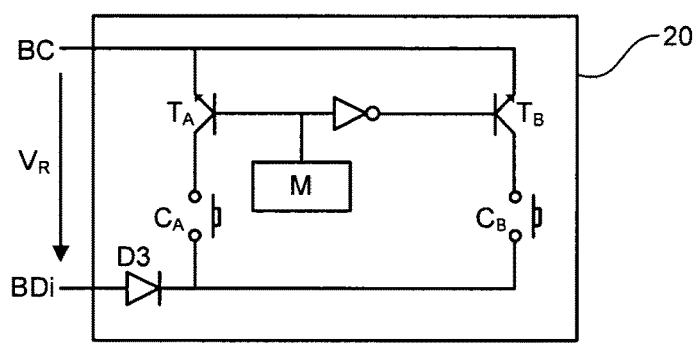

FIG. 6 shows a first solution allowing the states of the two contacts $C_A$, $C_B$ to be discriminated. In FIG. 6, two impedances $Z_A$, $Z_B$ are each connected in series with a contact $C_A$, $C_B$ in order to allow a discrimination by the currents. The two impedances $Z_A$, $Z_B$ have different values so that the two currents $I_A$ and $I_B$ flowing through each contact have different values and thus allow it to be determined which of the two contacts is active when only one of the two contacts is controlled into the closed state. By applying the voltage $V_R$ between the common terminal BC and the terminal BDi to which the two contacts $C_A$, $C_B$ are connected in parallel, the control module 1 will discriminate the states of the contacts in the following manner:

$C_A$ and $C_B$ in the open state: the current seen by the control module 1 will be zero $-I=0$ $C_A$ in the closed state and $C_B$ in the open state, the current seen by the control module 1 will have the value $I=I_A=V_R/Z_A$ $C_A$ in the open state and $C_B$ in the closed state, the current seen by the control module 1 will have the value $I=I_B=V_R/Z_B$ $C_A$ in the closed state and $C_B$ in the closed state, the current seen by the control module 1 will have the value $I=I_A+I_B=V_R/Z_A+V_R/Z_B$ FIG. 7 shows a second solution allowing the states of the two contacts $C_A$, $C_B$ to be discriminated. In FIG. 7, two zener diodes $DZ_A$, $DZ_B$ are each connected in parallel with a contact $C_A$, $C_B$ so as to enable a discrimination by the voltages. The two diodes $DZ_A$, $DZ_B$ have different values so as to be able to determine which of the two contacts is active when only one of the two contacts is controlled into the closed state. By applying the voltage $V_R$ between the common terminal BC and the terminal BDi to which the two contacts $C_A$, $C_B$ are connected in series, the control module 1 will discriminate the states of the contacts in the following manner:

$C_A$ and $C_B$ in the open state: the voltage seen by the control module is then equal to: $V_R=V_{ZA}+V_{ZB}$ $C_A$ in the closed state and $C_B$ in the open state, the voltage seen by the control module is then equal to: $V_R=V_{ZB}$ $C_A$ in the open state and $C_B$ in the closed state, the voltage seen by the control module is then equal to: $V_R=V_{ZA}$ $C_A$ in the closed state and $C_B$ in the closed state, the voltage seen by the control module is zero: $V_R=0$ In FIGS. 8A and 8B, the discrimination is carried out by time. In FIG. 8A, two transistors $T_A$ and $T_B$ are controlled one after the other so as to activate one or the other of the circuit branches carrying each contact $C_A$, $C_B$ being monitored. A monostable element M allows the two transistors $T_A$, $T_B$ to be alternately controlled. With reference to FIG. 8B, the read period $T_R$ is thus divided up into two parts. By applying the voltage $V_R$ between the common terminal BC and the terminal BDi, over a first part of the read period $T_R$, the control module 1 reads the state of the first contact $C_A$ and, over a second part of the read period $T_R$, the control module 1 reads the state of the second contact $C_B$.

The solution provided will notably allow a minimum of wires to be employed for addressing each human-machine dialogue device of the system, without however requiring either the use of intelligence in the devices, or a complex read/write method.

The invention claimed is:

1. A control module for a human-machine dialogue system, said human-machine dialogue system including a plurality of human-machine dialogue devices connected in series, at least one human-machine dialogue device of the plurality of human-machine dialogue devices including a functional button having at least one electrical contact, an indicator, or a combination of at least one electrical contact and of an indicator, said control module comprising:
   a microcontroller;
   a common terminal connected to each functional button; and
   several dedicated terminals each dedicated to individual control of the functional button of each human-machine dialogue device,
   wherein the human-machine dialogue devices are connected to the control module by a point-to-point link via a network of twisted cables, and
   wherein the microcontroller is configured to
   apply, over one read period, a first voltage of a first sign between the common terminal and each dedicated terminal in order to read a state of each electrical contact of each functional button of the plurality of connected human-machine dialogue devices, and
   apply, over one write period, a second voltage of sign opposite to the first sign in order to write a state of each indicator of the plurality of connected human-machine dialogue devices into each respective indicator.

2. The control module according to claim 1, wherein the microcontroller is configured to modify the application of the first and second voltages alternately over time and in that the read period is short with respect to the write period.

3. The control module according to claim 1, wherein each human-machine dialogue device includes at least two electrical contacts respectively connected to contacts from a group consisting of the several dedicated terminals of the control module and electrical contacts of another machine dialogue device.

4. A human-machine dialogue system, comprising:
   a control module,
   a plurality of human-machine dialogue devices connected in series, at least one human-machine dialogue device of the plurality of human-machine dialogue devices including a functional button having at least one electrical contact, an indicator, or a combination of at least one electrical contact and of an indicator, wherein the human-machine dialogue devices are connected to the control module by a point-to-point link via a network of twisted cables, wherein the control module includes a common terminal connected to all the plurality of human-machine dialogue devices and a dedicated terminal dedicated to the individual control of each functional button of the plurality of human-machine dialogue devices, and wherein the control module further includes a microcontroller configured to apply, over one read period, a first voltage of a first sign between the common terminal and each dedicated terminal in order to read a state of each electrical contact of each functional button of the plurality of connected human-machine dialogue devices, and apply, over one write period, a second voltage of sign opposite to the first sign in order to write a state of each indicator of the plurality of connected human-machine dialogue devices into each respective indicator.

5. The system according to claim 4, further comprising:
a second human-machine dialogue device equipped with the functional button having a first electrical contact and a second electrical contact connected in parallel, wherein the microprocessor is further configured to determine a state of the first electrical contact and a state of the second electrical contact over said read period.

6. The system according to claim 5, wherein the microprocessor is configured to determine the state of each of the first and second electrical contacts based on a level of current flowing through each of the first and second electrical contacts.

7. The system according to claim 5, wherein the microprocessor is configured to determine the state of each of the first and second electrical contacts based on a level of voltage across the terminals of each of the first and second electrical contacts.

8. The system according to claim 5, wherein the microprocessor is configured to divide the read period up into a first part designed to read the state of the first electrical contact and into a second part designed to read the state of the second electrical contact.

9. The system according to claim 4, wherein the indicator is of the light-emitting type.

* * * * *